Jan. 19, 1926. 1,570,071
J. MERCIER
JACK
Filed Dec. 1, 1924 3 Sheets-Sheet 1
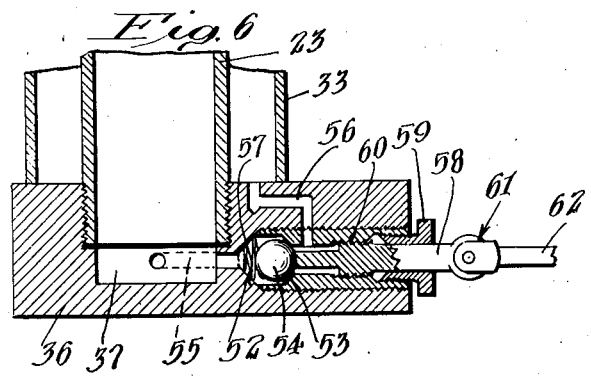
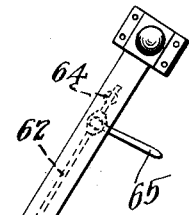
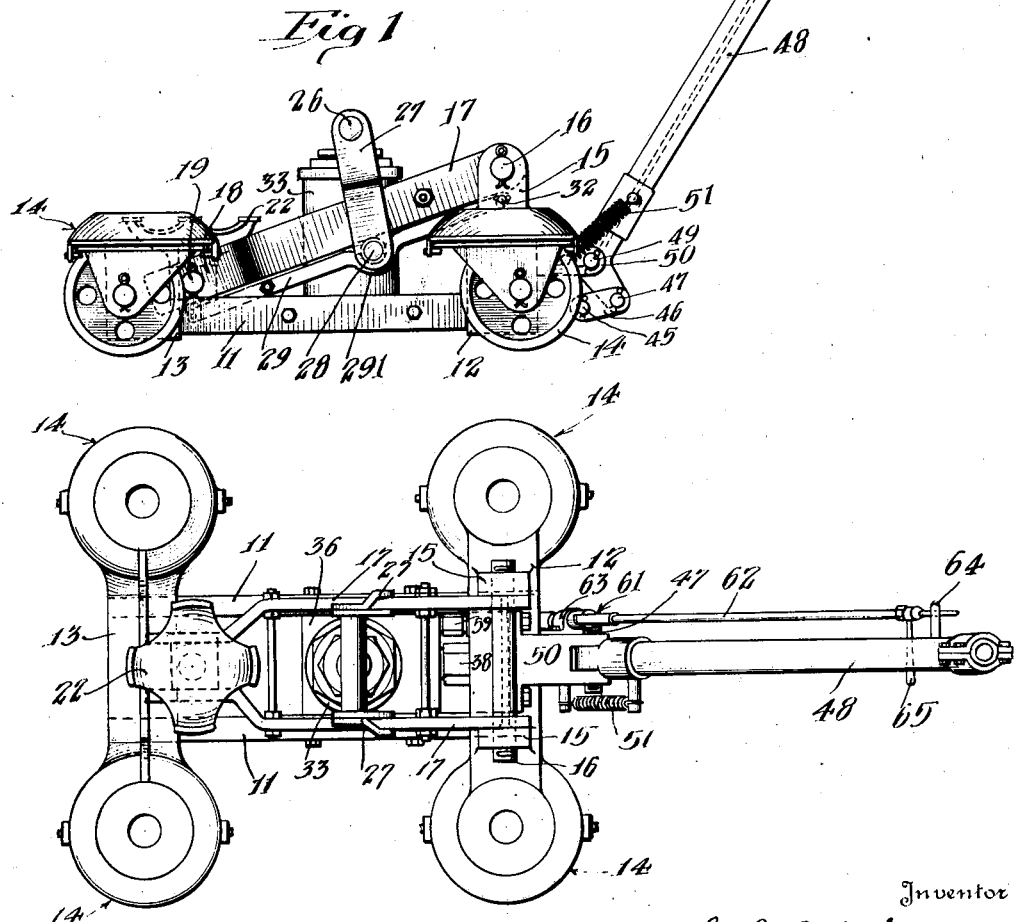
Inventor
Joseph Mercier
By Lyon+Lyon
Attorney

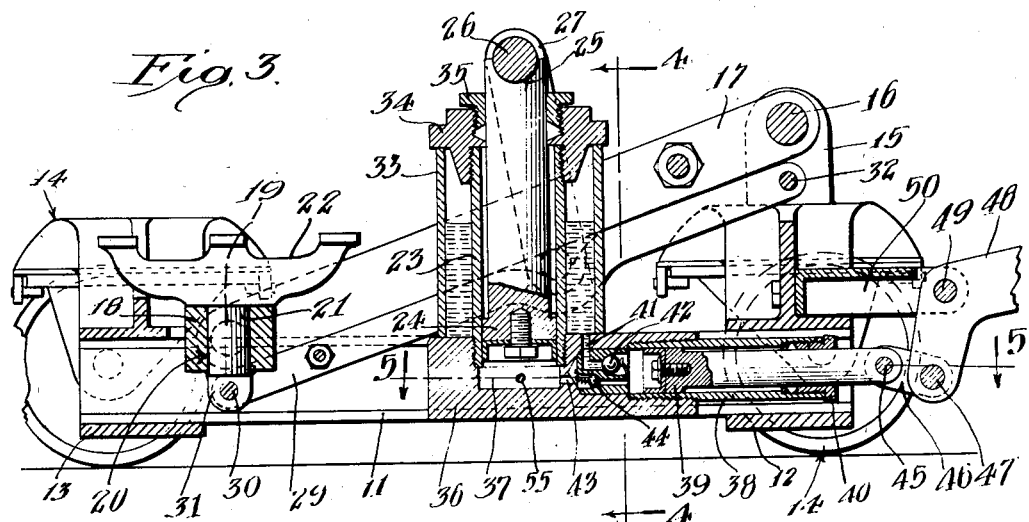
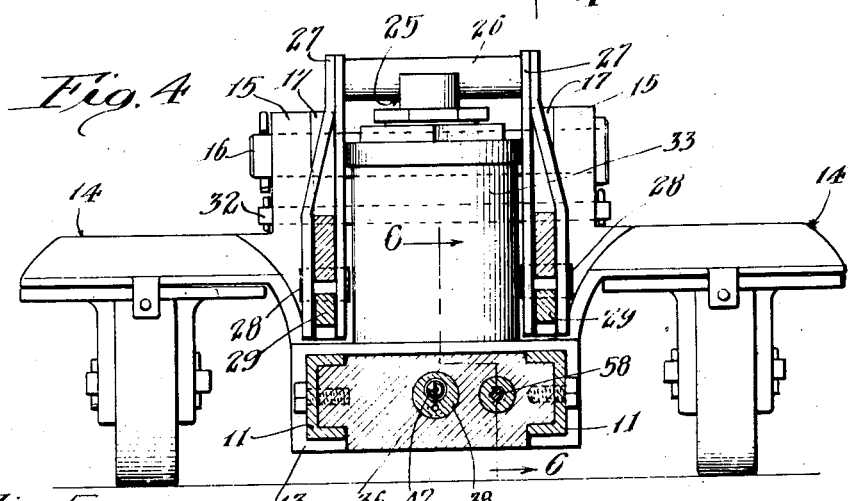
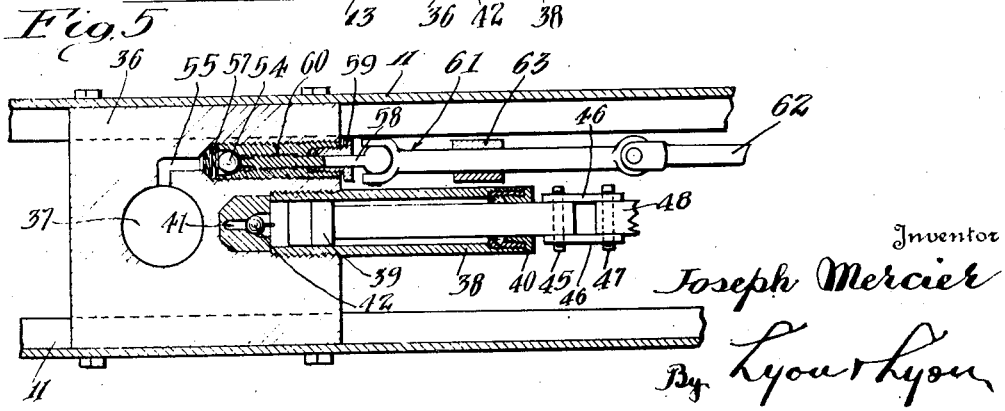

Jan. 19, 1926.　　　　　　　　　　　　　　　　1,570,071
J. MERCIER
JACK
Filed Dec. 1, 1924　　　3 Sheets-Sheet 3
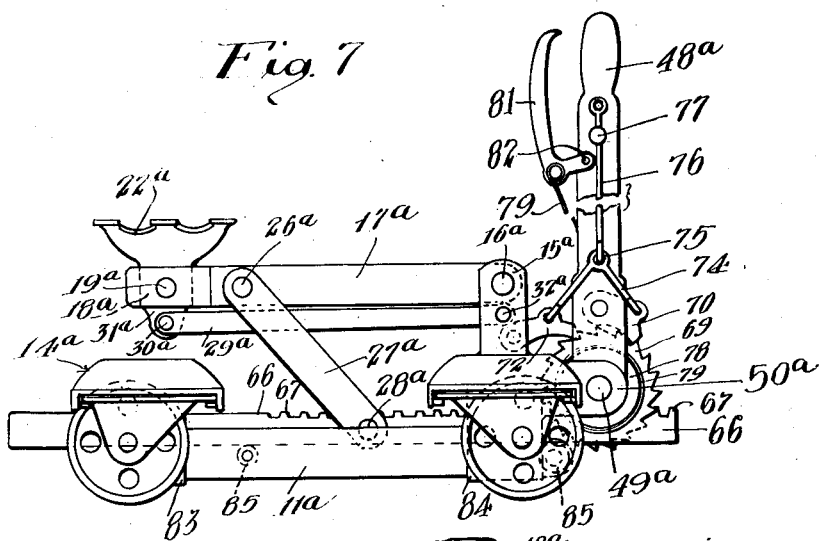
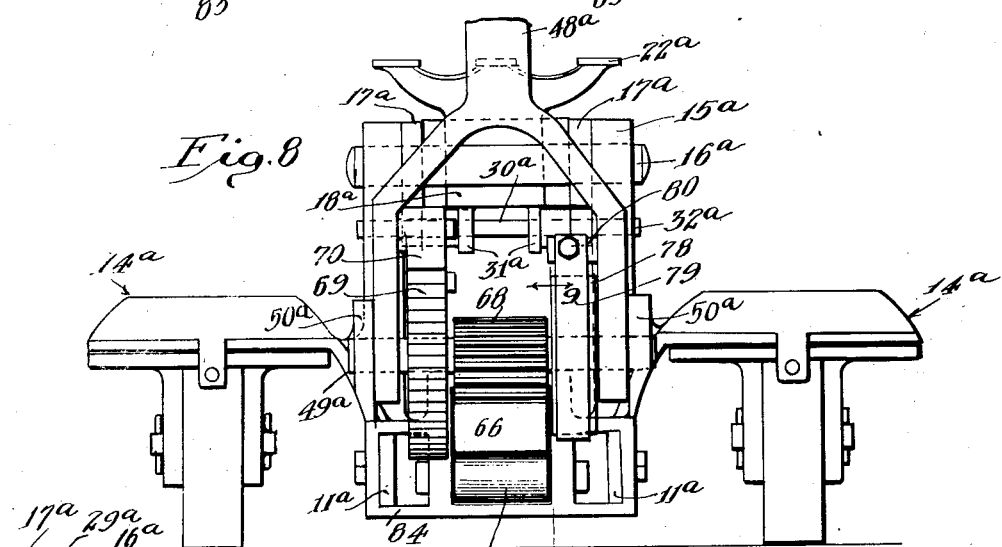
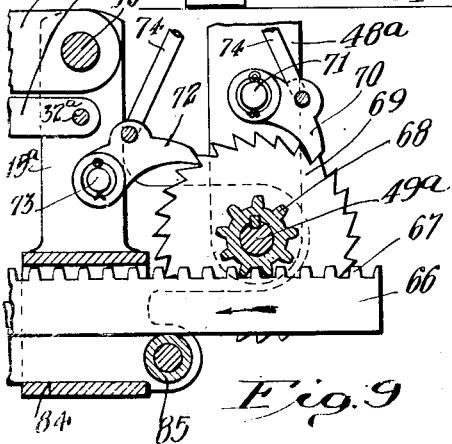
Inventor
Joseph Mercier
By Lyon+Lyon
Attorneys Patented Jan. 19, 1926.

1,570,071

UNITED STATES PATENT OFFICE.

JOSEPH MERCIER, OF LOS ANGELES, CALIFORNIA, ASSIGNOR OF ONE-HALF TO LUTE G. GILLELEN, OF LOS ANGELES, CALIFORNIA.

JACK.

Application filed December 1, 1924. Serial No. 753,140.

*To all whom it may concern:*

Be it known that I, JOSEPH MERCIER, a citizen of the United States, residing at Los Angeles, in the county of Los Angeles and State of California, have invented a new and useful Jack, of which the following is a specification.

This invention relates to jacks of the type employed for raising automobiles so that the tires thereof are free from the supporting surface and an important object of the invention is to make it possible to insert the lifting member of the jack beneath the axle of vehicles provided with the smaller diameter wheels and balloon tires. In the regular equipment for balloon tires, much smaller diameter wheels are employed than for the regular type of pneumatic tire and this results in lowering of the axles to a level much nearer the supporting surface of the vehicle than is the case where the larger wheel and regular penumatic tires are employed. The jack previously constructed cannot be placed beneath the lowered axles of cars equipped with the smaller wheels and balloon tires.

Another object of the invention is to provide for a relatively long stroke of the jack, since the cross sectional diameter of balloon tires is relatively great and, accordingly, the axle must be raised a considerable distance to substitute an inflated tire for a deflated one.

A further object is to provide in a pneumatic jack for very fine adjustments of the lifting member so that the jack can be used to advantage in assembling certain parts of the vehicle.

Other objects and advantages will appear in the subjoined detailed description.

The accompanying drawings illustrate several forms of the invention:

Figure 1 is a side elevation of a hydraulic jack constructed in accordance with the provisions of this invention.

Fig. 2 is a plan view of Fig. 1.

Fig. 3 is an enlarged broken elevation, mainly in midsection, of the jack shown in Figs. 1 and 2.

Fig. 4 is an end elevation, partly in section on the line indicated by 4—4, Fig. 3.

Fig. 5 is a sectional plan detail of the pump on the line indicated by 5—5, Fig. 3.

Fig. 6 is an enlarged fragmental section on the line indicated by 6—6, Fig. 4.

Fig. 7 is a side elevation of a different form of jack constructed in accordance with the provisions of this invention.

Fig. 8 is an end elevation from the right of Fig. 7.

Fig. 9 is a broken detail of the ratchet drive, partly in section on the line indicated by 9—10, Fig. 8.

Fig. 10 is an elevation, mainly from the line indicated by 9—10, Fig. 8.

First describing the form of the invention shown in Figs. 1 to 6, inclusive, there is provided a suitable frame constructed, in this instance, of spaced longitudinal members 11 and front and rear cross members 12, 13, respectively. The opposite ends of the members 12, 13 are supported on casters 14.

Projecting up from the cross member 12 are spaced ears 15 which support the fulcrum 16 of a lifting member 17 which, in this instance, is a lever of the third class. The lever 17 is of skeleton construction and supports at its forward end a trunnion block 18, the pivots of which are indicated at 19. The trunnion block 18 is provided with a vertical socket 20 in which seats a pivot 21 of a rest 22 which is adapted to engage beneath the body that is to be raised. Thus the rest 22 is swiveled on the lever 17 so that it is self adjusting about its axis.

Suitable means are provided between the fulcrum 16 and rest 22 to raise and lower the lever 17. This means, in this instance, comprises a hydraulic device constructed as follows: The cylinder of the hydraulic device is indicated at 23 and working in said cylinder is a plunger 24 which is provided in its upper end with a bearing 25 that engages beneath the middle portion of a pivot 26. The pivot 26 connects the plunger 24 to a link or links 27 which, in this instance, are external of the lever 17. The lower ends of the links 27 carry studs 28 which project inwardly beneath the lever 17 so that said lever is pivotally connected with the links. When the plunger 24 is moved upwardly it carries the links 27 with it and swings the lever 17 on its fulcrum 16, thus raising the rest 22.

Parallel motion links 29 are provided to maintain the trunnion block 18 with its socket 20 vertically positioned throughout the movement of the lever 17. The links 29 are pivoted at one end at 30 to downwardly projecting ears 31 of the trunnion block 18 and said links 29 are pivoted at their opposite ends at 32 to the ears 15 previously described. The distance between the axes of the pivots 16, 19 is the same as that between the axes of the pivots 30, 32, thus insuring that the rest 22 will remain horizontal whatever the position of the lever 17. The links 29 have bends in them to form seats 291 for the studs 28 so as to hold the studs from sliding along the lever 17.

A reservoir 33 is provided for the liquid that operates the plunger 24 and said reservoir, in this instance, surrounds the cylinder 23, the upper end of the reservoir being formed by a cap 34 screwed onto and forming the upper head of the cylinder 23. In the cap 34 is a stuffing box 35 through which the plunger 24 operates. The bottom of the reservoir 33 and lower cylinder head is formed by a recessed member 36 which seats between the members 11 of the frame and into which the cylinder 23 is screwed, the recess or chamber being indicated at 37 and forming an extension of the cylinder bore.

A pump is provided to pump the liquid from the reservoir into the cylinder bore and the pump, (see especially Fig. 3), is constructed as follows: A pump cylinder 38 is screwed into the member 36 and is provided with a plunger 39 working through a stuffing box 40 in the outer end of the cylinder 38. A duct 41 leads from the reservoir 33 to the bore of the cylinder 38 and said duct is controlled by an inwardly opening ball valve 42 so that on the suction stroke of the plunger 39 the fluid will flow from the reservoir through the duct and into the bore of the pump cylinder 38. Another duct 43 connects the chamber 37 with the bore of the cylinder 38 and is controlled by an outwardly opening ball valve 44 so that the compression stroke of the plunger 39 will force the liquid that has been drawn into the cylinder 38 from said cylinder through the duct 43 into the chamber 37 to raise the plunger 24.

The plunger 39 is operated by any suitable mechanism, constructed, in this instance, as follows: Pivoted at 45 to the plunger 39 is a link or links 46 which are pivoted at 47 to an operating lever 48 fulcrumed at 49 on a bracket 50 secured to the cross member 12. The operating lever 48 being relatively long also constitutes the tongue by which the jack is rolled to and from position beneath the vehicle. A coil spring 51 tends to hold the lever 48 in elevated position and when the lever 48 is swung downwardly it drives the plunger 39 inwardly so as to force the liquid into the chamber 37.

In order to lower the plunger 24, after it has been driven upwardly by operation of the pump plunger 39, it becomes necessary to permit the liquid that has been pumped into the cylinder 23 to discharge from said cylinder into the reservoir 33 and the construction relied upon to effect this (see especially Fig. 6), is as follows: The member 36 is provided with a valve chamber 52 having a valve seat 53 and a ball valve 54 adapted to close on said seat. The valve chamber 52 on one side of the valve 54 connects by a duct 55 with the chamber 37 and the valve chamber 52 on the other side of the valve 54 connects by a duct 56 with the reservoir 33. A spring 57 tends to hold the ball valve 54 in closed position so that normally liquid cannot flow from the chamber 37 into the reservoir 33. The valve 54 is operated against the pressure of the spring 57, to open the valve, by a rod 58 which passes through a stuffing box 59 in the outer end of the valve chamber 52 and is threaded at 60 into the valve chamber. The rod 58 is connected by a universal coupling 61 (see Fig. 5), to an operating rod 62, there being a bearing 63 for the universal coupling and a bearing 64 for the rod 62 to turn in. The bearing 64 is connected with the lever 48. The rod 62 is provided with a handle 65 for turning it to effect opening and closing of the valve 54.

To operate the jack constructed as above described, the jack will be wheeled into the desired position beneath the vehicle with the rest 22 beneath the part that is to be engaged for jacking up the vehicle, the lever 17 being in the lowered position shown in the drawings. The operator will swing the lever 48 up and down, thus pumping liquid from the reservoir 33 into the cylinder 23. This causes the lever 17 to swing upwardly to engage the rest 22 with the desired part of the vehicle and continued pumping of the liquid will raise the vehicle. It will be noted that because of the described construction of the lever and its operating mechanism, the rest 22, when the lever 17 is in its lowered position, is quite close to the surface upon which the jack rests, so that the rest 22 can easily be placed beneath an axle that is quite close to the ground, as will be the case when the vehicle is equipped with the balloon type of wheels and tires and the tire is deflated.

When it is desired to lower the vehicle, so that the tire rests upon the ground or other surface, the handle 65 will be turned to cause the screw threads 60 to operate to move the rod 58 inwardly to unseat the valve 54, thus permitting liquid beneath the plunger 24 to flow out of the cylinder 23 into the reservoir 33.

Now describing the form of the invention shown in Figs. 7 to 10, inclusive, the elements that correspond in function to the elements previously described, will be designated by the same reference characters with the addition of the letter exponent "a" and need not be described in detail since the above description of the corresponding parts will suffice.

The links 27ª are connected at their lower ends by a pivot 28ᵃ which passes through and pivots the links 27ᵃ to a rack 66, the teeth 67 of which project upwardly and are engaged by a pinion 68 that is keyed to a shaft 49ᵃ. The lever 48ᵃ is pivoted by the shaft 49ᵃ which is supported at its opposite ends in the bracket 50ᵃ.

Fixed to the shaft 49ᵃ is a ratchet wheel 69 for turning said shaft and the ratchet wheel is turned by a pawl 70 that is pivoted at 71 to the lever 48ᵃ. The pawl 70 and the teeth of the ratchet wheel are arranged, in this instance, so that downward swinging of the lever 48ᵃ effects turning of the ratchet wheel and upward swinging of said lever causes the pawl to slip over the ratchet teeth. To hold the ratchet wheel 69 stationary when the lever 48ᵃ is being swung upwardly, a dog 72 engages the ratchet teeth and is pivoted at 73 to one of the ears 15ᵃ, as clearly shown in Fig. 9.

In order to retract the pawl 70 and dog 72 so as to permit the ratchet wheel 69 to rotate in a reverse direction to that which effects raising of the lever 17ᵃ, an inverted V-shape link 74 loosely engages the pawl 70 and dog 72 and is provided with an eye 75 that is engaged by the lower end of a release rod 76 slidable through a bearing 77 projecting from one side of the lever 48ᵃ.

In order to have control over the rate of descent of the lever 17ᵃ, there is keyed to the shaft 49ᵃ a brake drum 78 and wrapped around the brake drum is a band 79. The band 79 is preferably wrapped more than a single turn around the brake drum so as to produce greater friction between the band and drum. One end of the band 79 is anchored at 80 to the lever 48ᵃ, (see Fig. 10), and the other end, as seen in Fig. 7, connects with a lever 81 which is pivoted at 82 to the lever 48ᵃ.

The rack 66 is slidably mounted in slotted guides 83, 84, that depend from the frame, and said rack rides upon guide rollers 85, one of which is mounted on the guide 84 and the other on one of the longitudinal bars 11ᵃ of the frame.

To use the form of the invention shown in Figs. 7 to 10, inclusive, the operator will move the jack to the desired position beneath the vehicle and will swing the lever 48ᵃ up and down to intermittently rotate the ratchet wheel 69, thus to effect movement of the rack 66 in the direction of the arrow thereon in Fig. 9. This movement of the rack moves the links 27ᵃ to position nearer the vertical which, consequently, swings the lever 17ᵃ upwardly so as to raise that part of the vehicle engaged by the jack.

When it is desired to lower the vehicle, the operator will move the lever 81 toward the lever 48ᵃ so as to tighten the brake band 79 upon the drum and he will then pull upwardly on the rod 76 to release the pawl and dog from the ratchet wheel. The operator is now holding the lever 17ᵃ elevated solely by friction between the brake drum and brake band and he will lessen the pressure of his hand upon the lever 81 to whatever degree is required to permit the lever 17ᵃ to descend at the desired rate.

I claim:

1. A jack comprising a frame, a lever fulcrumed at one end on the frame, a rest tiltably mounted relative to the lever on the opposite end of the lever, means to prevent tilting of the rest relative to the frame as the lever operates, a link pivoted to the lever intermediate of the ends thereof, an operating lever pivotally mounted on the frame, and means operated by the last mentioned lever and connected with the link to move the link into a position to hold the free end of the first mentioned lever elevated.

2. A jack comprising a frame, a lever fulcrumed at one end on the frame, a rest on the opposite end of the lever, a link pivoted to the lever intermediate of the ends thereof, a cylinder mounted on the frame, a plunger in the cylinder connected with the link, a liquid reservoir mounted on the frame, means to pump liquid from the reservoir into the cylinder including a tongue pivotally connected with the frame, a rod rotatably mounted on the tongue, and means operated by rotation of said rod to permit liquid to flow from the cylinder into the reservoir.

3. A jack comprising a frame, a lever fulcrumed on the frame, a rest tiltably mounted on the lever, means to prevent tilting of the rest relative to the frame as the lever operates, an operating lever pivotally connected with the frame, and means operably connecting the two levers.

4. A jack comprising a frame, a lever fulcrumed on the frame, a rest tiltably mounted on the lever, means to prevent tilting of the rest relative to the frame as the lever operates, an operating lever pivotally connected with the frame, and a hydraulic device interposed between the two levers and operated by the last mentioned lever.

5. A jack comprising a frame, a lever fulcrumed at one end on the frame, a rest on the opposite end of the lever, a link pivoted to the lever intermediate of the ends thereof, a cylinder mounted on the frame, a plunger in the cylinder connected with the link, a liquid reservoir mounted on the frame, means to pump liquid from the reservoir into the cylinder including a tongue pivotally connected with the frame, a rod movably mounted on the tongue, and means operated by movement of the rod to permit flow of liquid from the cylinder into the reservoir.

6. A jack comprising a frame, a cylinder mounted on the frame, a plunger in the cylinder, a rest, means operated by the plunger to raise the rest, a reservoir mounted on the frame, a pump to force liquid from the reservoir into the cylinder, a valve chamber having a seat, a valve to close on the seat, a duct connecting the chamber on one side of the valve with the cylinder bore, a duct connecting the chamber on the other side of the valve with the reservoir, a spring tending to hold the valve closed, and a rod threaded into the valve chamber and engaging the valve to unseat said valve.

7. A jack comprising a frame, a lever fulcrumed at one end on the frame, a trunnion block on the other end of the lever, a rest mounted on the trunnion block, a link pivoted at one end to the trunnion block and at its other end to the frame and lying in parallelism with the lever, and means connected with the intermediate portion of the lever to raise and lower said lever.

8. A jack comprising a frame, a lever fulcrumed at one end on the frame, a trunnion block on the other end of the lever, a rest vertically pivoted on the trunnion block, a link pivoted at one end to the trunnion block and at its other end to the frame and lying in parallelism with the lever, and means connected with the intermediate portion of the lever to raise and lower said lever.

Signed at Los Angeles, California, this 22d day of November, 1924.

JOSEPH MERCIER.